United States Patent Office 3,095,763
Patented July 2, 1963

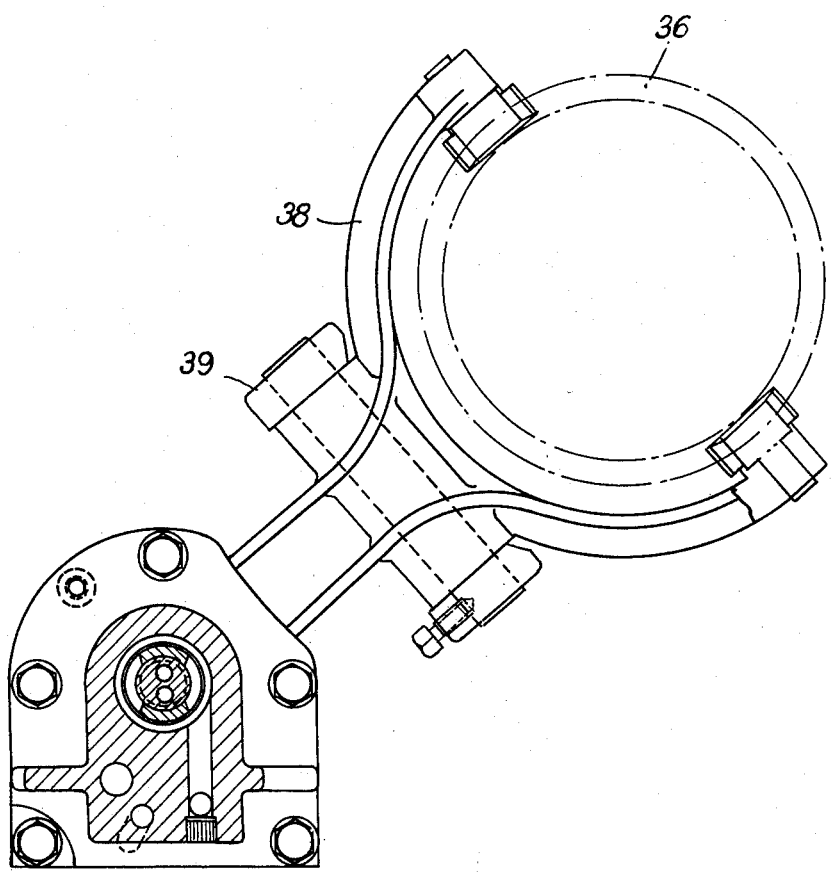

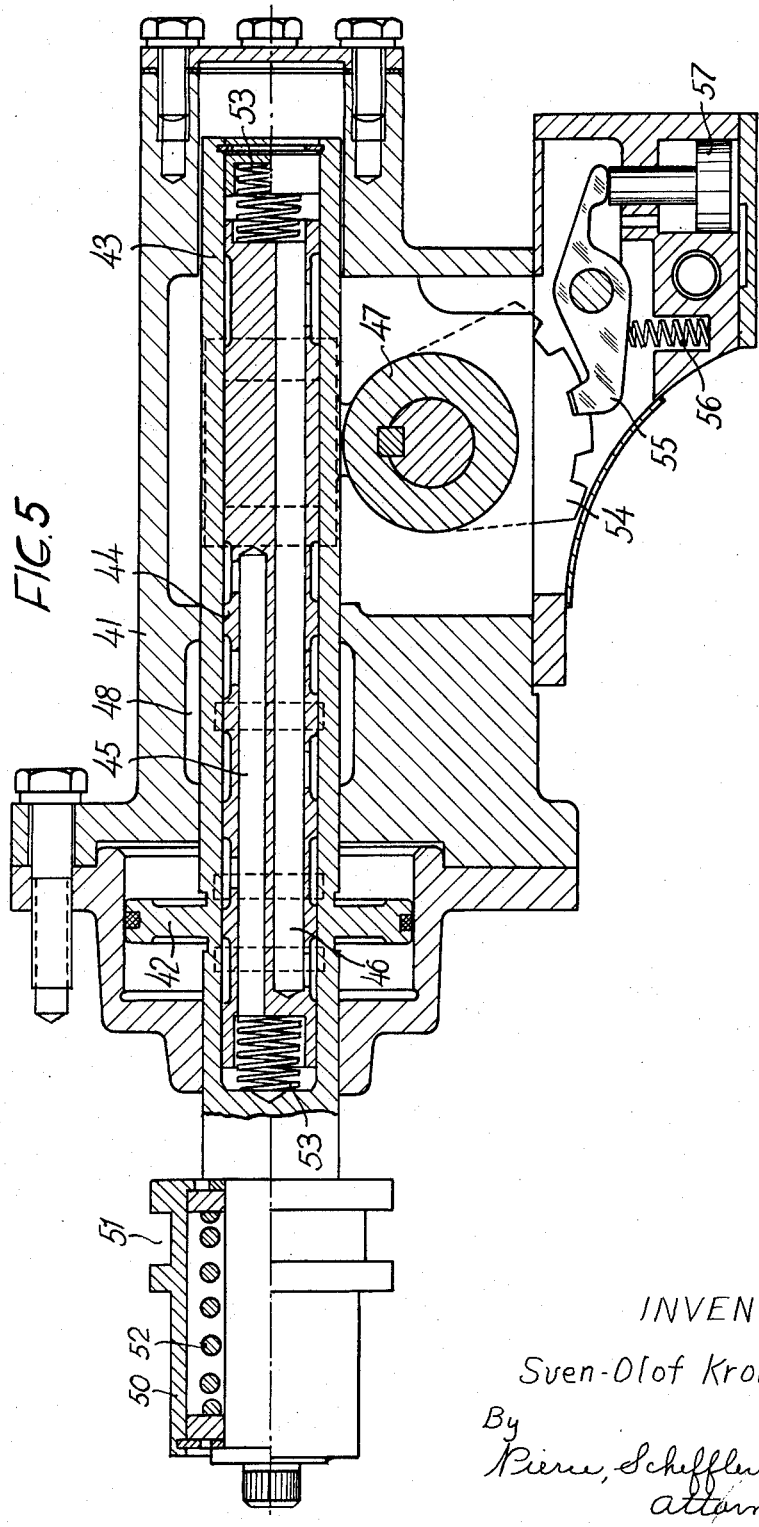

3,095,763
CONTROL SYSTEM FOR HYDRAULICALLY OPERATED VARIABLE SPEED TRANSMISSIONS FOR MOTOR VEHICLES
Sven-Olof Kronogård, Karnvedsgatan 19, Gothenburg, Sweden
Filed Dec. 22, 1959, Ser. No. 861,301
Claims priority, application Sweden Dec. 23, 1958
8 Claims. (Cl. 74—754)

This invention relates to control systems for hydraulically operated variable speed transmissions for motor vehicles, particularly of the type comprising a hydraulic torque converter, a mechanical gearing, preferably of the planetary type, connected to the converter, and a selector lever for manual adjustment of the transmission to effect different drives by shifting a selector valve and engaging and disengaging a clutch device for forward and reverse drive. The invention has for its object to facilitate shifting of said lever and is substantially characterized in that a hydraulic servo motor for assisting the manual power in the transmission between the selector lever and the clutch device.

Figure 1:
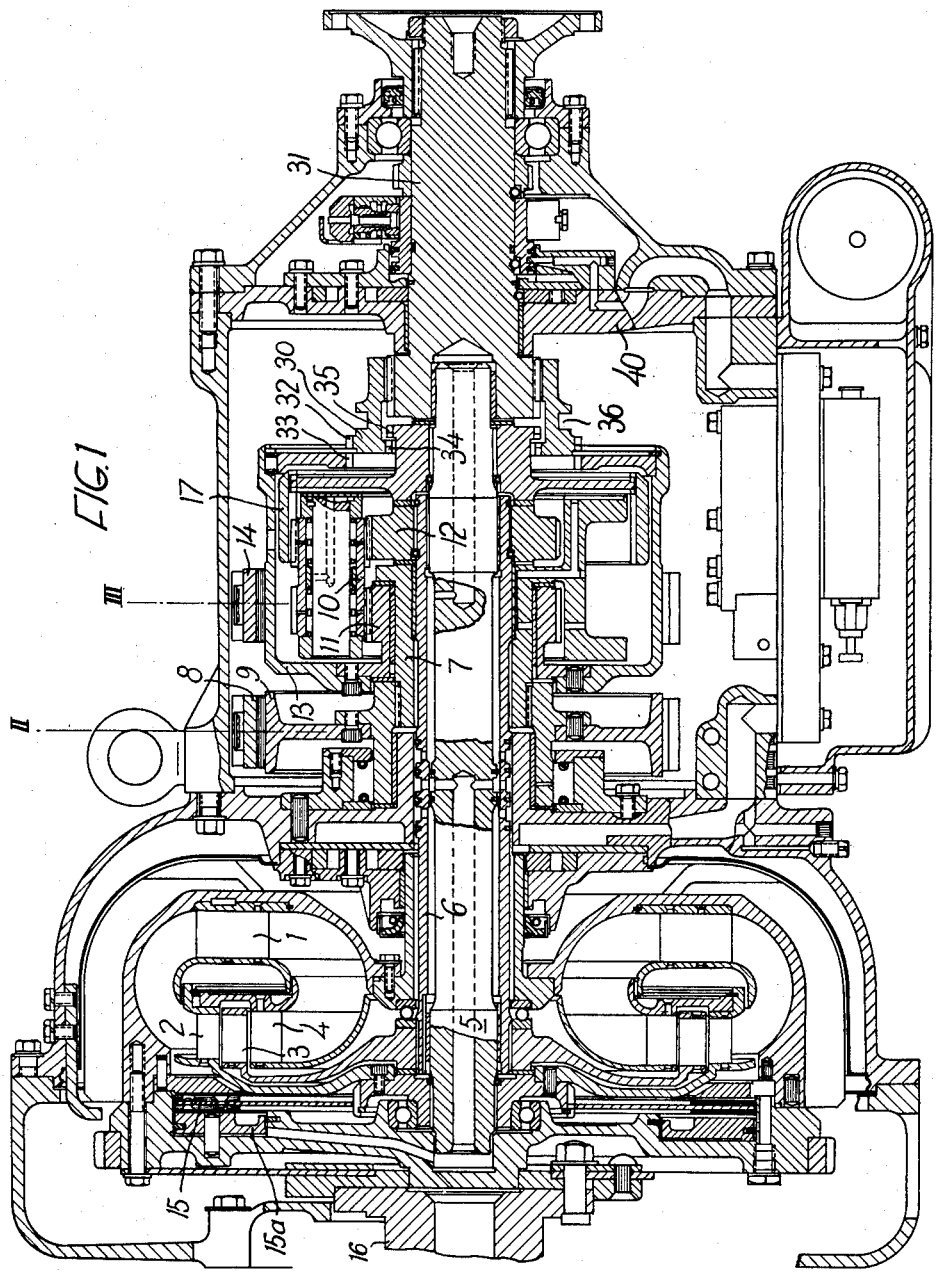
Figure 2:
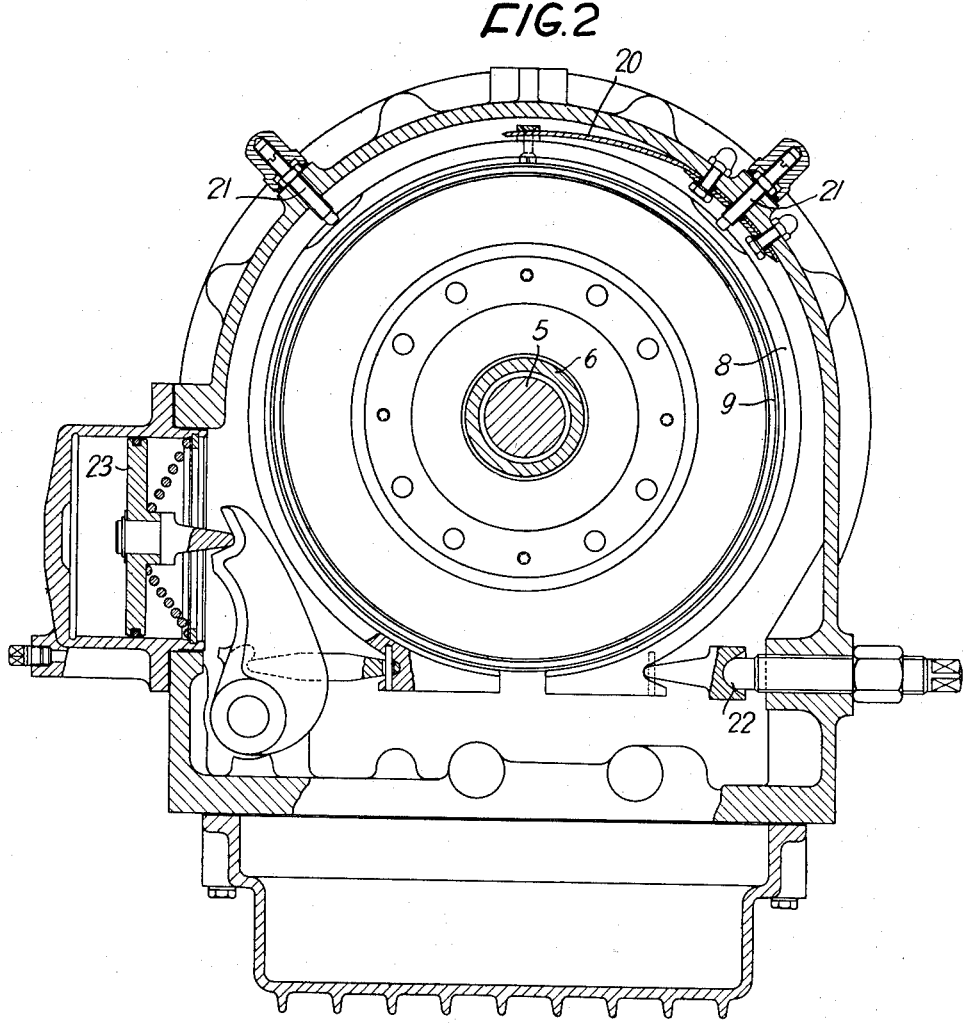
Figure 3:
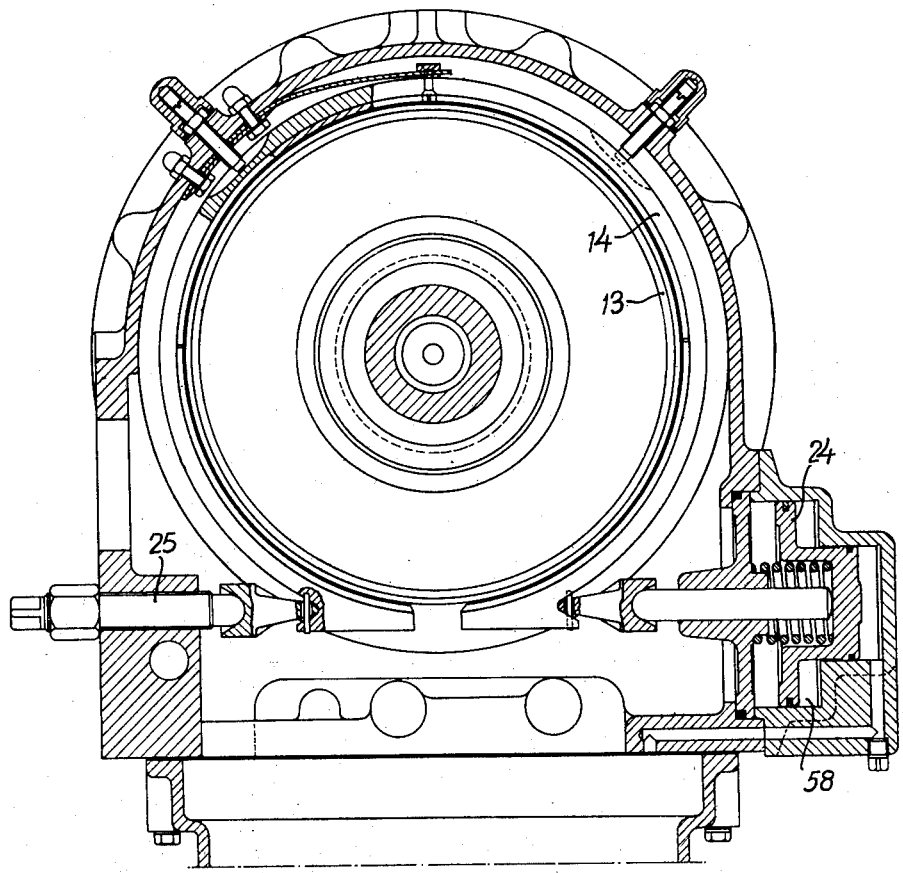

The invention is described more closely hereinbelow with reference to an embodiment thereof illustrated in the accompanying drawing. FIG. 1 is a longitudinal sectional view of a variable speed transmission comprising a hydraulic torque converter in combination with a planetary gear. FIGS. 2 and 3 are sectional views along the lines II—II and III—III, respectively, of FIG. 1. FIGS. 4 and 5 illustrate a rear view and a longitudinal sectional view, respectively, of a shift control comprised in the transmission according to FIG. 1.

The torque converter comprised in the transmission according to FIG. 1 is of the two-phase type and consists of an impeller 1, a first turbine stage 2, a rotatable reactor 3 and a second turbine stage 4, the blading of which is supported by the blading of the first turbine stage 2. The two output shafts 5 and 6 of the torque converter are interconnected by means of a planetary gear the planet carrier 7 of which can be locked by means of a brake band 8 cooperating with a brake drum 9. When the planet carrier 7 is stationary, the torque converter acts as a two-phase converter with a high torque ratio. The planet gears 10 are twin gears in mesh with two sun gears 11 and 12. The sun gear 11 is connected to a brake drum 13 which can be engaged by a brake band 14. The sun gear 12 is mounted on the shaft 6 of the rotary reactor 3. When the brake band 8 is disengaged and the brake band 14 engaged, the reactor 3 is held stationary and the torque converter acts as a single-phase converter. There is also provided a clutch 15 by means of which the input shaft 16 of the transmission can be directly connected with the output shaft 5 which extends through the transmission and has mounted thereon the ring gear 17 of the planetary gear.

It will be seen from FIG. 2 that the brake band 8 which is resilient and tends to expand is depending from a spring 20 and guided by pins 21 which enter corresponding recesses in the circumference of the band. The ends of the band 8 are hook-shaped, and one end bears on an adjustable abutment 22, whereas the other end is engaged by a lever which can be actuated by a servo motor 23. As a result of this arrangement, the brake band cannot come into contact with any point of the rotating brake drum when the brake is disengaged. FIG. 3 shows that the brake band 14 is arranged in a corresponding manner and adapted to be actuated by a servo motor 24, there being also provided an adjustable abutment 25 corresponding to the abutment 22 for the band 8.

In FIG. 1, numeral 30 denotes a clutch sleeve which is adjustable in three different positions. The sleeve 30 is slidable on splines on a shaft portion 31 which is connectible to the drive wheels of the vehicle. The sleeve has external lugs or teeth 32 for cooperation with an internally toothed rim 33 on the brake drum 13 and further has internal lugs or teeth 34 for cooperation with external teeth 35 on the ring gear 17. In FIG. 1 the clutch sleeve 30 is shown in its neutral position. If the sleeve is moved to the left, the teeth 32 will engage the teeth 33 of the brake drum to establish reverse drive. If the sleeve is moved in the opposite direction, the teeth 34 will engage the teeth 35 so as to connect the ring gear 17 and the shaft 5 with the shaft portion 31 which then rotates in the forward direction. The sleeve 30 has a circumferential groove 36 for a clutch-operating lever.

In FIG. 4, this clutch-operating lever is shown at 38. It is a two-armed lever pivotally mounted on supports 39 which are provided inside a partition 40 at the right hand end of the transmission as viewed in FIG. 1. The lever 38 is actuated by a device a sectional view of which is shown in FIG. 5.

Referring to FIG. 5, numeral 41 denotes a casing for a movable servo motor piston 42 which has a tubular piston rod 43. Movable within the tubular piston rod 43 is a slide valve 44 which has two ducts 45 and 46. Provided in a recess in the casing 41 is a lever 47 which engages recesses on either side of the valve 44 so as to reciprocate the valve upon angular movement of the lever 47. Pressure fluid is supplied into a space 48 in the casing 41. Within this space, the piston rod 43 has inlet ports for the pressure fluid. Upon displacement of the valve 44 in either direction from the position shown, the ports in the valve will be put into communication with the ports in the piston rod, and pressure fluid will enter one of the ducts 45 and 46. If the valve is moved to the left as viewed in the drawing, pressure fluid will enter the duct 45 and hence the cylinder space to the right of the servo motor piston 42 which will be moved to the left. At the same time pressure fluid in the cylinder space to the left of the servo motor piston 42 will be discharged through the duct 46 and a valve port at the right hand end of the duct. After the piston 42 has been moved equally far as the valve 44 the supply of pressure fluid is cut off. Consequently, the piston 42 will substantially exactly follow the movements of the valve 44.

At its left end, as viewed in FIG. 5, the piston rod 43 is provided with a sleeve 50 which has a groove 51 for the bifurcated end of the clutch-operating lever 38. The sleeve 50 is displaceable on the piston rod 43 in both directions against the action of a spring 52. The spring is comparatively strong and becomes active in such cases only where the teeth of the clutch sleeve 30 during shifting movements are facing the teeth with which they are to be engaged. To reduce this risk, all of the teeth are bevelled on the side which is not loaded in operation, as will be seen from FIG. 1.

By means of a suitable transmission, the clutch-operating lever 47 is connected with a selector lever provided in the driver's space. By means of the selector lever, the clutch-operating lever can be set in either of three positions defined by a locking ball device or the like and corresponding to the neutral, reverse and forward position of the clutch sleeve 30. The valve 44 is inserted into the piston rod 43 by means of springs 53 so as to offer a certain resistance to the shifting movement of the lever whereby the driver gets a feeling that the shifting operation is effected manually in spite of the fact that the manual effort required is comparatively small.

The lever 47 or the shaft on which it is mounted has a recessed segment 54 in engagement with a pawl 55. A spring 56 biases the pawl into engagement with the segment and thus prevents angular movement of the lever 47, the purpose of this arrangement being to prevent shifting during driving. The pawl can be disengaged by an auxiliary servo piston 57 the cylinder of which communicates with a member of the hydraulic system in which member a superatmospheric pressure prevails only when the vehicle is at a stand-still and the accelerator pedal is released. For instance, the cylinder may communicate with the space 58 to the right of the servo motor piston 24 for engaging the brake band 14 (FIG. 3) for single-phase operation. In this phase the pressure is superatmospheric during the above named conditions of operation only, and in this case the piston 58 will be raised so as to move the pawl 55 in a counter-clockwise direction out of engagement with the segment 54.

What I claim is:

1. A control system for controlling the operation of a hydraulically-operated variable speed motor vehicle transmission system of the type including a hydraulic torque converter, mechanical gearing means connected to said converter and including an output shaft, clutch means operably connected to said mechanical gearing means for alternately causing forward and reverse drive of said output shaft, said clutch means being of the jaw clutch type including two clutch members one of which is movable into and out of engagement with the other, and manually-operable selector lever means for operating said clutch means; said control system comprising a hydraulic servo motor of the double acting piston type having one working chamber on each side of the piston thereof, said piston being connected to said clutch means by means of a piston rod, said piston rod having a bore therein, a control valve member slidable in said bore and spring means biasing said control valve member to a neutral position in said bore of said piston rod, said piston rod having ports therein controlled by said control valve member for supplying pressure liquid to and discharging liquid from said servo motor chambers to move said piston and thus operate said clutch means, said selector lever being connected to said control valve member to move the same relative to said piston rod.

2. A control system for controlling the operation of a hydraulically-operated variable speed motor vehicle transmission system of the type including a hydraulic torque converter, mechanical gearing means connected to said converter and including an output shaft, clutch means operably connected to said mechanical gearing means for alternately causing forward and reverse drive of said output shaft, said clutch means being of the jaw clutch type including two clutch members one of which is movable into and out of engagement with the other, and manually-operable selector lever means for operating said clutch means; said control system comprising a hydraulic servo motor of the double acting piston type having one working chamber on each side of the piston thereof, said piston being connected to said clutch means by means of a piston rod, said piston rod having a bore therein, and a control valve member slidable in said bore, said control valve member having a pair of overflow ducts therein which are each open at one end of the valve and alternately serve as inlets and outlets so that upon displacement of the valve in either direction a pressure is built up at one end of the bore of the piston rod, which pressure counteracts the movement of the valve, said piston rod having ports therein controlled by said control valve member for supplying pressure liquid to and discharging liquid from said servo motor chambers to move said piston and thus operate said clutch means, said selector lever being connected to said control valve member to move the same relative to said piston rod.

3. A control system for controlling the operation of a hydraulically-operated variable speed motor vehicle transmission system of the type including a hydraulic torque converter, mechanical gearing means connected to said converter and including an output shaft, clutch means operably connected to said mechanical gearing means for alternately causing forward and reverse drive of said output shaft, said clutch means being of the jaw clutch type including two clutch members one of which is movable into and out of engagement with the other, and manually-operable selector lever means for operating said clutch means; said control system comprising a hydraulic servo motor of the double acting piston type having one working chamber on each side of the piston thereof, said piston being connected to said clutch means by means of a piston rod, said piston rod having a bore therein, and a control valve member slidable in said bore, said control valve member and said piston rod having ports cooperating with each other and serving alternately as inlets and outlets to cause, upon displacement of said control valve member in a given direction, pressure fluid to be supplied to one working chamber of said servo motor and to be drained from the other working chamber and thus effect displacement of said piston, the resultant displacement of said piston causing the communication between said ports to be interrupted whereby said piston will follow the movement of said control valve member and thus operate said clutch means, said selector lever being connected to said control valve member to move the same relative to said piston rod.

4. A control system for controlling the operation of a hydraulically-operated variable speed motor vehicle transmission system of the type including a hydraulic torque converter, mechanical gearing means connected to said converter and including an output shaft, clutch means operably connected to said mechanical gearing means for alternately causing forward and reverse drive of said output shaft, said clutch means being of the jaw clutch type including two toothed clutch members one of which is movable into and out of engagement with the other, and manually-operable selector lever means for operating said clutch means; said control system comprising a hydraulic servo motor of the double acting piston type having one working chamber on each side of the piston thereof, said piston being connected to said clutch means by means of a piston rod, and spring means interposed between said piston rod and clutch means whereby to enable said selector lever means to be shifted to engage said clutch means even through the teeth of said clutch members temporarily face each other to prevent meshing engagement of the teeth, said piston rod having a bore therein, and a control valve member slidable in said bore, said piston rod having ports therein controlled by said control valve member for supplying pressure liquid to and discharging liquid from said servo motor chambers to move said piston and thus operate said clutch means, said selector lever being connected to said control valve member to move the same relative to said piston rod.

5. Apparatus as defined in claim 4 and further including a sleeve slidably mounted upon said piston rod, said sleeve having a groove in the outer periphery thereof by means of which said sleeve is operatively connected to said clutch means, said spring means being connected intermediate said sleeve and said piston rod for transmitting the shifting force applied to said piston rod to said sleeve.

6. A control system for controlling the operation of a hydraulically-operated variable speed motor vehicle transmission system of the type including a hydraulic torque converter, mechanical gearing means connected to said converter and including an output shaft, clutch means operably connected to said mechanical gearing means for alternately causing forward and reverse drive of said output shaft, said clutch means being of the jaw clutch type including two clutch member one of which is movable into and out of engagement with the other, and manually-operable selector lever means for operating said clutch means; said control system comprising a hydraulic servo motor of the double acting piston type having one working chamber on each side of the piston thereof, said piston being connected to said clutch means by means of a piston rod, said piston rod having a bore therein, a control valve member slidable in said bore, said piston rod having ports therein controlled by said control valve member for supplying pressure liquid to and discharging liquid from said servo motor chambers to move said piston and thus operate said clutch means, said selector lever being connected to said control valve member to move the same relative to said piston rod, releasable detent means for retaining said selector lever means in various predetermined positions and means for locking said detent means to prevent the release thereof, said locking means being releasable to permit changing of the position of said selector lever means only when the motor vehicle is motionless and the power control is in the idling position.

7. Apparatus as defined in claim 6 wherein said locking means comprises a locking member acting upon the connection between said selector lever means and said control valve member, spring means retaining said locking member in an operative locking position, and auxiliary servo-motor means for moving said locking member to an inoperative unlocking position.

8. Apparatus as defined in claim 7 wherein said auxiliary servo motor means is of the hydraulic piston type having a working chamber in communication with a chamber of the hydraulic system in which prevails a subatmospheric pressure only when the vehicle is stationary and the engine is idling.

References Cited in the file of this patent
UNITED STATES PATENTS

| | | |
|---|---|---|
| 2,392,520 | Benz et al. | Jan. 8, 1946 |
| 2,543,927 | Montgomery | Mar. 6, 1951 |
| 2,584,995 | Fageol | Feb. 12, 1952 |
| 2,658,412 | Kelbel | Nov. 10, 1953 |
| 2,757,557 | Hoffman | Aug. 7, 1956 |
| 2,796,851 | Ziskal | June 25, 1957 |
| 2,891,516 | Pippenger | June 23, 1959 |
| 2,922,400 | Lorence | Jan. 26, 1960 |
| 2,953,038 | Richards | Sept. 20, 1960 |